H. CAVE.
HOSE CONNECTION.
APPLICATION FILED OCT. 24, 1916.

1,235,876.

Patented Aug. 7, 1917.

INVENTOR
Henry Cave
BY
ATTORNEY

UNITED STATES PATENT OFFICE.

HENRY CAVE, OF ELIZABETH, NEW JERSEY, ASSIGNOR TO DAVIS-BOURNONVILLE COMPANY, OF JERSEY CITY, NEW JERSEY, A CORPORATION OF NEW YORK.

HOSE CONNECTION.

1,235,876.

Specification of Letters Patent.  Patented Aug. 7, 1917.

Application filed October 24, 1916. Serial No. 127,330.

*To all whom it may concern:*

Be it known that I, HENRY CAVE, a citizen of the United States, and a resident of Elizabeth, in the county of Union and State of New Jersey, have invented a new and useful Hose Connection, of which the following is a specification.

The object of this invention is to provide improved means for making connections with flexible hose, the aim being to secure a simple and effective connection which will hold the hose firmly against a high degree of internal pressure and at the same time not cause any weakening of the wall which would give rise to rupture. Other and more particular objects will become apparent as the specification proceeds.

In the accompanying drawings illustrating the invention:

Figure 1:
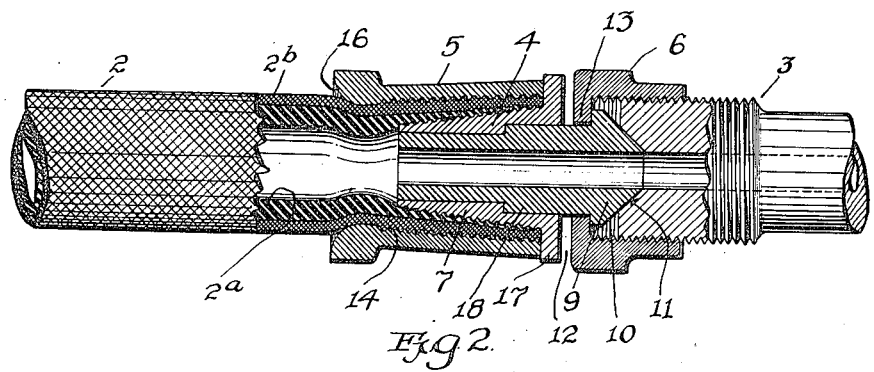
Figure 1 is a longitudinal section through the connection.
Figure 2:
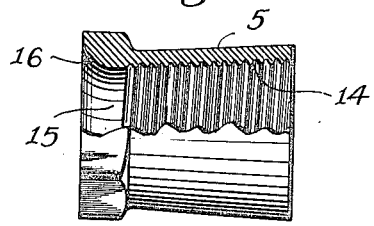
Fig. 2 is a view partly in longitudinal section and partly in elevation of the outside sleeve.
Figure 3:
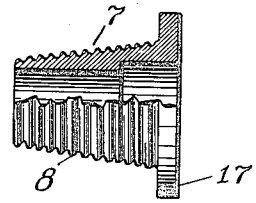
Fig. 3 is a similar view of the body part of the inner member.
Figure 4:
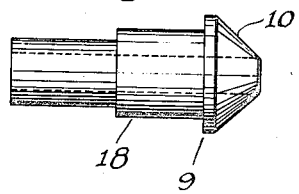
Fig. 4 is an elevation of the central piece which fits into the part shown in Fig. 3.

In these views, the hose is designated 2, and 3 represents a pipe or conduit member to which the end of the hose is to be coupled, the connection being more particularly designed for uniting the ends of small oxygen and acetylene hose to the inlets of the valves of an oxy-acetylene torch. The hose employed is partly of rubber and partly of fabric, the rubber making the wall impervious to the passage of gas and the fabric affording resistance to its pressure; and it is a special object of the invention to make use of this property of strength in the fabric for the purpose of producing a reliable coupling. In ordinary hose connections as constructed for purposes such as above indicated the holding is largely or entirely through the rubber, and is consequently unreliable. I have accordingly devised a connection which is designed to take hold of the fabric, but in such a manner as not to cause breaking of the hose or lessening of its imperviousness at or near the end of the coupling.

The preferred form of hose selected for illustration comprises a rubber tube 2ª and a heavy braided fabric cover 2ᵇ united to the rubber, but it will be understood that there are other forms which may also be employed.

The end of the hose is gripped between an inner member 4 and an external sleeve 5, the inner member being drawn up against the pipe end by a screw coupling collar 6.

The inner member has a tapered body 7 formed upon the taper with a screw-thread 8, rounded so as not to injure the hose. Projecting at the large end of the body is a head 9 formed with a seat 10 to bear against a complementary seat 11 on the pipe end, and with a circumferential groove or recess 12 between the seating portion and the body, within which recess the flange 13 of the coupling collar is swiveled for rotary movement while confined against separation.

The sleeve 5 is also tapered, in the same direction as the body 7, but in substantially less degree, its taper bore being formed with a screw-thread 14 similar to the thread 8. Beyond the screw-thread 14 at the smallest part of the sleeve, is a smooth throat 15, terminating in a rounded flaring mouth 16. This throat may be and preferably is appreciably smaller than the hose, yet such is the formation of the part that the sleeve may be pushed straight inward over the hose before the insertion of the inner member without resistance from the screw-thread 14. The outer, or major, portion of the threaded interior of the sleeve is larger in diameter than the normal size of the hose, that is to say larger than the diameter of the hose where not expanded. With the sleeve pushed back out of the way, the said inner member is screwed into the hose until an outstanding flange 17 at the base of the taper body abuts against the hose end. This operation expands the end of the hose, reducing the thickness of the rubber and tightening upon the fabric and produces an external slope or flare whereon the sleeve 5 is now screwed in an outward direction, so as to clamp the expanded hose wall against the inner member. The result is to hold the wall of the hose between the converging threaded tapers with exceeding firmness and with a gradually increasing degree of confinement toward the outer extremity, where the opposed gripping surfaces have little or nothing between them but fabric, the rubber being compressed and squeezed out of the way. Toward the inner end of the coupling, however, the clamped hose wall increases in thickness and is subjected to progressively decreasing degrees of compression so that there is no point of weakening where the hose is likely to break or burst. By thus graduating the grip from the extreme down to nothing, there must be, for any hose, a place along the length of the clamped region where the hose wall is gripped to best advantage, neither so hard that the fabric or rubber is cut, nor so loosely as not to hold. The flaring mouth 16 not only contributes to the ease of passing the sleeve over the hose but also saves the hose wall from cutting when it is pressed against this extremity by bending or by internal pressure. Furthermore, the parts are so proportioned that the sleeve with its smooth constricted throat extends farther inward than the taper body 11, so that the throat presses the wall of the hose inward immediately beyond the small end of said inner member, thereby rendering it impossible for the fluid pressure to gain entrance between the said member and the hose wall. For convenience in turning the sleeve may be provided with a hexagon enlargement 19 to receive a wrench.

The inner member, which constitutes a unit for purposes of operation, is preferably made in two parts, one part forming the hollow taper body 7 with the flange 17, and the other being a bored-out central piece 18 formed to fit the interior of the body piece and having the head 9 and seat 10 formed by its projecting portion. The two-part construction of the inner member enables this member and the coupling collar to be readily assembled and has the special advantage of holding the collar against possible undesired separation.

What I claim as new is:

1. In a hose connection for a fabric and rubber hose, the combination of inner and outer members with double tapered, screw-form converging gripping surfaces adapted the one to expand and the other to compress the hose wall and to hold the same with a graduated grip.

2. A hose connection comprising an inner member having a tapered and threaded body whereby it is adapted to be screwed into the end of a hose, a coupling member connected with said inner member, and a sleeve adapted to be passed inward over the hose before the insertion of the inner member and having a tapered and threaded interior, the taper of said interior being in the same direction as the taper of the inner body but substantially less in degree, whereby upon screwing the sleeve outward on the expanded end of the hose the hose wall is clamped firmly, in such manner that the degree of compression increases gradually from the inner end of the clamped region outward.

3. In a hose connection, the combination with an inner tapered and threaded member adapted to be screwed into the end of a hose, of a sleeve to be passed inward over the hose before the insertion of the inner member and thereafter screwed outward upon the expanded end of the hose, said sleeve having its interior tapered in the same direction as the inner member but to a substantially less degree, a screw-thread on such interior taper to engage the hose, and a smooth throat at the narrow inner end portion terminating in a rounded flaring mouth.

4. In a hose connection, the combination with an inner tapered and threaded member adapted to be screwed into the end of a hose, of a sleeve to be passed inward over the hose before the insertion of the inner member and thereafter screwed outward upon the expanded end of the hose, said sleeve having its interior tapered in the same direction as the inner member but to a substantially less degree, a screw-thread to engage the hose on such interior taper, and a smooth throat at the narrow inner end portion terminating in a rounded flaring mouth, the smooth constricted throat being narrower than the hose and the sleeve being of such length that the throat presses the hose wall inward immediately beyond the end of the inner member.

HENRY CAVE.